United States Patent Office 3,153,441
Patented Oct. 20, 1964

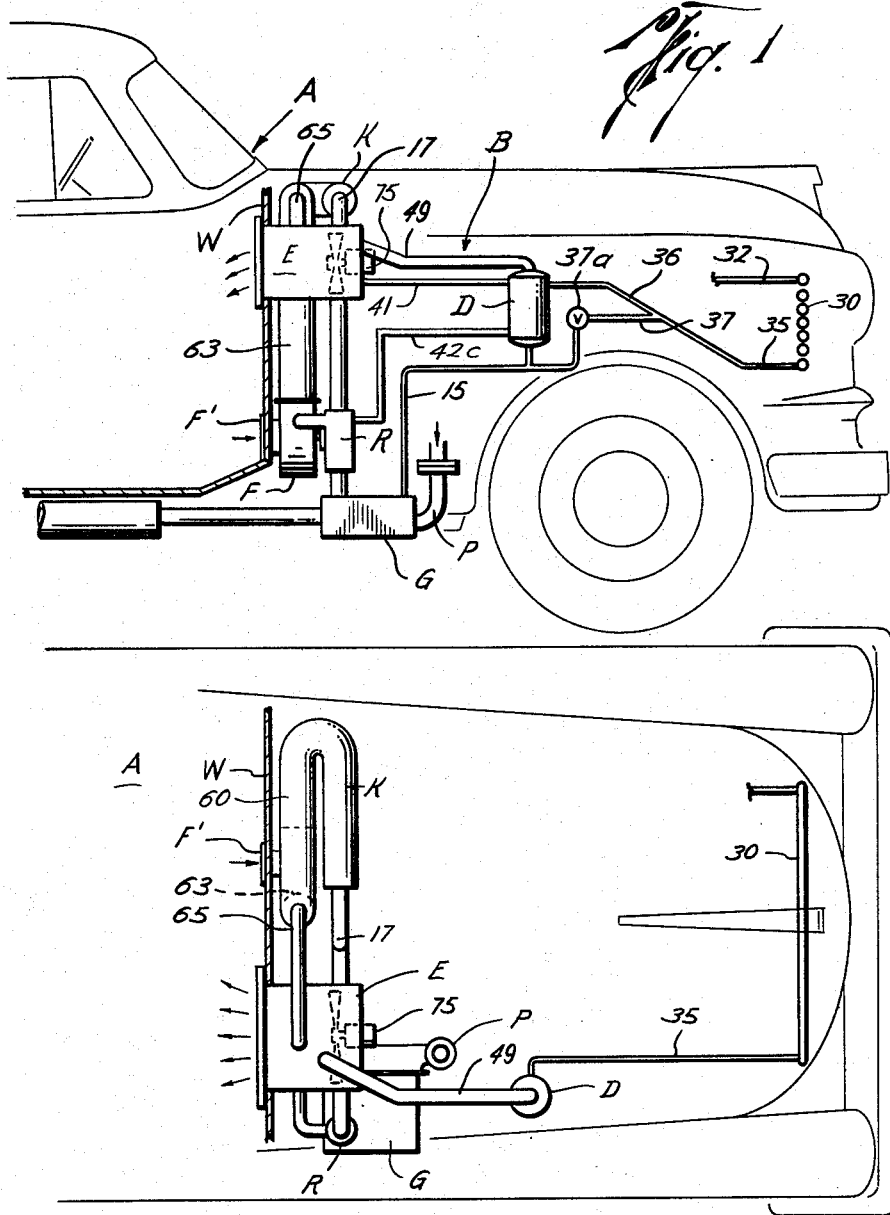

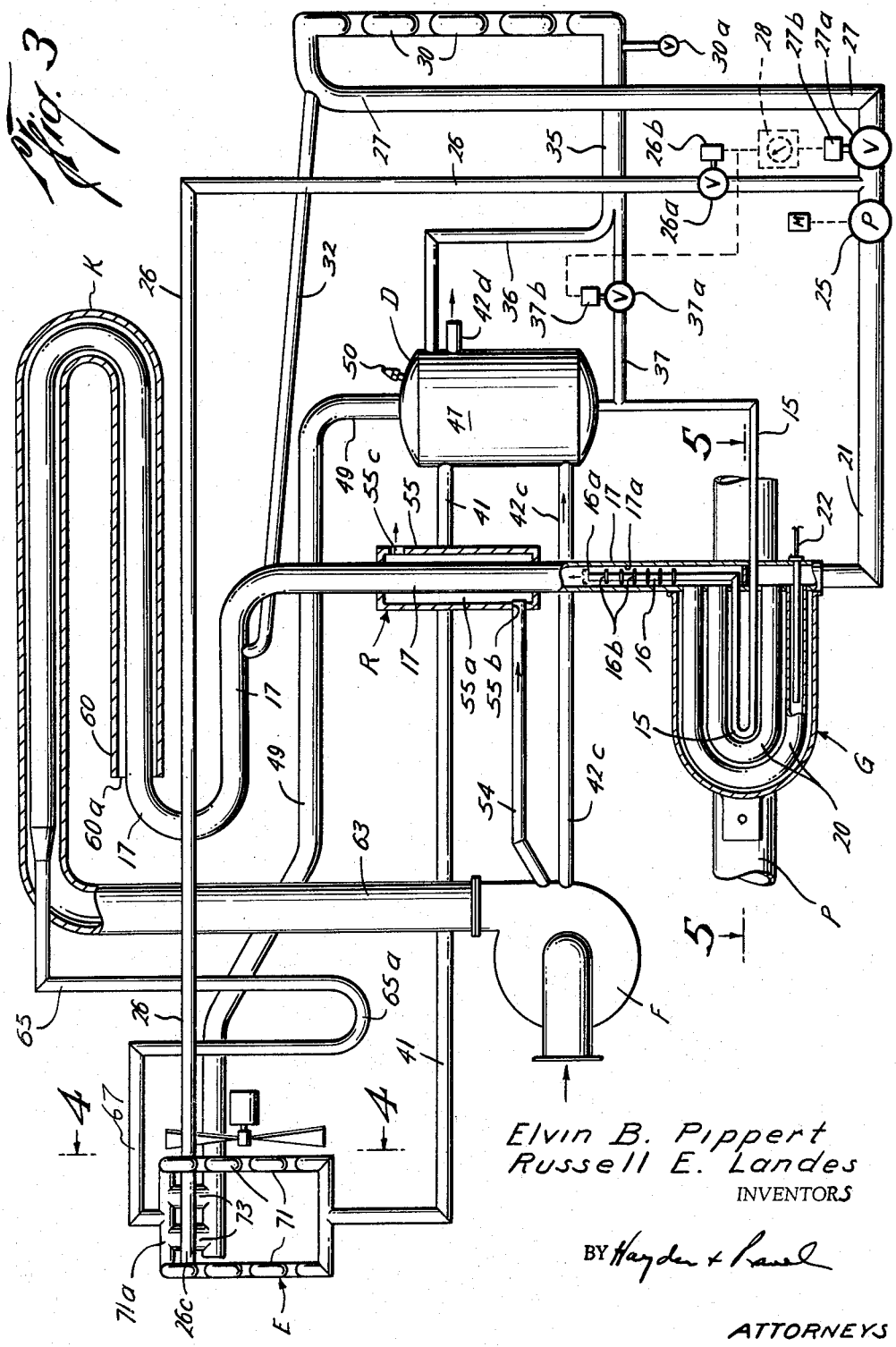

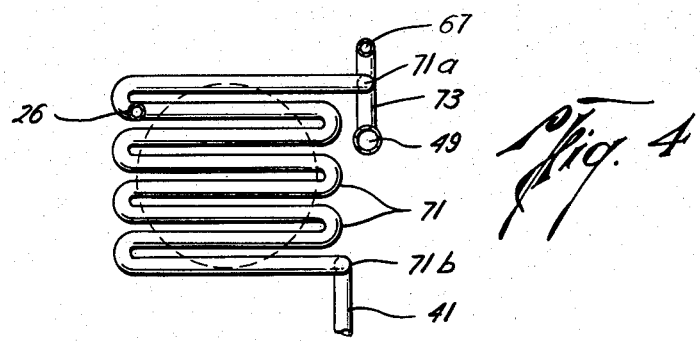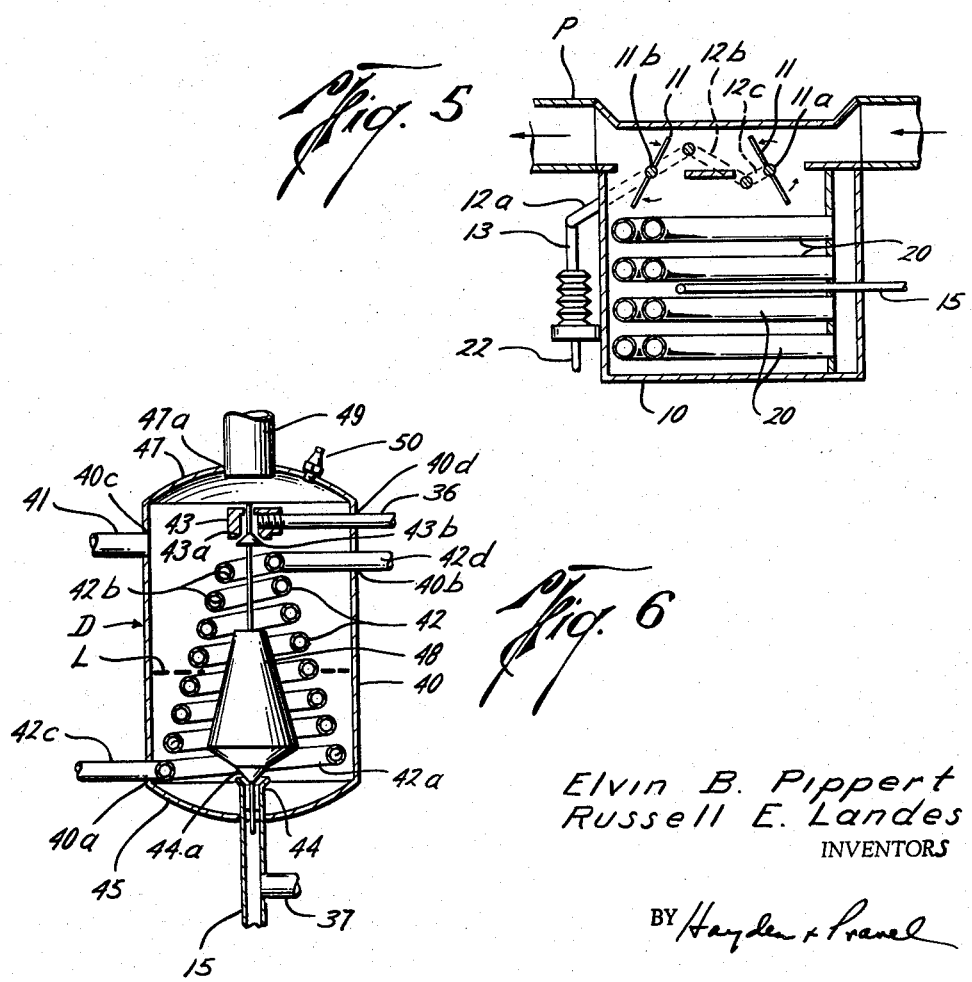

3,153,441
HEATING AND AIR-CONDITIONING UNIT
Elvin B. Pippert, 862 W. 42nd St., Houston, Tex., and
Russell E. Landes, Humble, Tex.; said Landes assignor
to said Pippert
Filed May 10, 1963, Ser. No. 279,361
10 Claims. (Cl. 165—42)

This invention relates to new and useful improvements in heating and air-conditioning apparatus and particularly to a combination heating and air-conditioning unit for an automobile or other vehicle having an internal combustion engine.

An object of the present invention is to provide a new and improved combination heating and air-conditioning apparatus adapted for use in an automobile or the like having an internal combustion engine wherein the same apparatus heats and cools.

Another object of the present invention is to provide a new and improved combination heating and air-conditioning apparatus for heating and cooling automobiles or the like wherein such apparatus is adapted to operate on waste heat from an internal combustion engine.

Another object of the present invention is to provide a new and improved heating and air-conditioning unit wherein the same refrigerant serves for both heating and cooling.

And yet another object of the present invention is to provide a new and improved heating and air-conditioning unit for automobiles and similar vehicles wherein a generator receives heat from an internal combustion engine to convert a liquid refrigerant circulated in an absorption cycle from liquid to gas for cooling purposes and wherein the generator heats the liquid refrigerant for heating purposes.

A still further object of the present invention is to provide a new and improved combination heating and air-conditioning unit adapted for heating and cooling an automobile or the like wherein such unit, which operates without a compressor for the refrigerant, functions without imparting any operating load on the internal combustion engine of the automobile or other vehicle.

And still another object of the present invention is to provide a new and improved air-conditioning apparatus adapted for cooling an automobile or the like.

And yet another object of the present invention is to provide a new and improved absorption type refrigerating apparatus for cooling an automobile or the like wherein such apparatus is adapted to operate on waste heat from an internal combustion engine.

Another object of the present invention is to provide a new and improved absorber for use in an absorption type refrigerating apparatus adapted for cooling an automobile or other similar vehicle.

A further object of the present invention is to provide a new and improved generator adapted for utilizing waste heat from an internal combustion engine for vaporizing a liquid refrigerant in an absorption refrigeration system.

And still a further object of the present invention is to provide a new and improved heat exchange coil for expanding a liquid refrigerant in an absorption type refrigerating system.

Another object of the present invention is to provide a new and improved heat exchange apparatus adapted for cooling and condensing a gaseous refrigerant released by heating a liquid refrigerant in an absorption type refrigerating system.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a phantom drawing of an automobile illustrating in schematic elevation the heating and air-conditioning apparatus of this invention positioned in the automobile;

FIG. 2 is a phantom drawing of an automobile illustrating a schematic plan of the heating and air-conditioning apparatus of this invention positioned in the automobile;

FIG. 3 is a view, partly schematic and partly in elevation, illustrating the details of the preferred form of the apparatus of this invention, and particularly forming a part of the apparatus of this invention;

FIG. 4 is a sectional view taken on line 4—4 of FIG. 3 of the drawings illustrating details of one type of evaporator adapted to be used in conjunction with the apparatus of this invention;

FIG. 5 is a sectional view taken on line 5—5 of FIG. 3 illustrating one type of heat control for the generator of this invention; and FIG. 6 is a sectional view of the preferred type of absorber which is adapted to be used in conjunction with the apparatus of this invention.

In the drawings, the letter A designates an automobile and the letter B designates generally the heating and air-conditioning apparatus of this invention which is primarily adapted for heating and cooling the passenger compartment of an automobile or other vehicle.

Such apparatus, which employs a gas absorption system rather than a mechanical compressor in the cooling cycle is adapted to use the same substance for effecting both the cooling and the heating in different cycles. In this particular invention the refrigerant, which is preferably a solution of aqua ammonia or some other liquid refrigerant, is activated by heat such as waste heat from an internal combustion engine of an automobile or other vehicle as will be more fully explained. Although certain elements of the apparatus of this invention are used in both the heating and in the cooling cycles, for the sake of clarity, each cycle will be discussed separately.

First, considering the cooling cycle of the present invention more in detail, the cooling apparatus includes a generator G which is normally in communication with or secured in close proximity to the exhaust pipe P of an internal combustion engine or other source of heat in an automobile A or other vehicle.

The generator G includes a case or housing 10 which is adapted to receive heat or hot exhaust gas from the exhaust pipe P for heating the refrigerant as will be more fully explained.

As illustrated in the drawings (FIGS. 3 and 5) one or more butterfly valves 11 are pivotally mounted on pins 11a and 11b between the housing 10 and the exhaust pipe P for deflecting the flow of hot exhaust gas from the exhaust pipe P and circulating such gas through the housing 10. The butterfly valves 11 are connected by links 12a, 12b and 12c to the actuating plunger 13 which is preferably a thermostatically controlled plunger P of the ordinary bellows or wafer type which is provided for controlling the temperature in the generator G. The plunger 13 may be mounted on the housing 10 or on some other convenient mounting adjacent thereto.

Encased in the generator housing 10 are one or more pre-heat conductors 15 adapted to have a liquid refrigerant therein, such as a solution of aqua ammonia or other liquid refrigerant.

As illustrated in the drawings, in the preferred form of the invention, pre-heat conductor or conductors 15 form a U-shaped coil in the housing 10 and are connected at one end to a standpipe 16 which stands substantially vertically and extends upwardly into a gas collecting conduit or pipe 17. A strong aqua ammonia solution is heated as it passes through the fluid conductors 15 in the generator G and percolates upwardly through the standpipe 16, the heat causing the solution to rapidly release a portion of the ammonia as a gas. As the refrigerant emerges from the upper end 16a of the standpipe 16 it is partly liquid and partly gas. The gaseous ammonia rises in the collecting conduit or pipe 17 and passes through a rectifier R as will be described more fully herein. The remaining liquid portion of the refrigerant is a weak aqua ammonia solution and is returned by gravity flow through the annulus betwen the standpipe 16 and the gas collecting conduit 17 to one or more return passages 20 in the generator housing 10. Annular baffles 16b are formed on the standpipe 16 below its upper end 16a. Such annular baffles 16b extend circumferentially of the standpipe 16 and also extend radially outwardly from the standpipe 16 almost to the inner wall 17a of the gas collecting pipe 17. Thus, a small space is provided between the periphery of the baffles 16b and the inside surface 17a of the gas collecting conduit 17 to allow the aqua ammonia solution which has percolated out of the top 16a of the standpipe 16 to flow downwardly by gravity to the return tubes or passages 20 through which the aqua ammonia solution is returned to the return line 21. Additional vaporization occurs as the solution returns through the tubes 20 causing the release of additional ammonia gas which rises past the baffles 16b to the conduit 17. The generator G may be provided with a thermocouple 22 or other heat sensitive device may be provided for regulating the temperature in the generator G. The thermocouple 22, which is of known construction having a thermal fluid adapted to expand and contract in response to temperature changes, is operably connected to the butterfly valves 11 to open and close such valves 11 to heat the generator initially and also to maintain the temperature in the generator within the preselected ranges in the heating and cooling cycles respectively. It should be noted that the thermocouple 22 may also be adapted to open the valves 11 to allow the maximum heat to flow through the generator G thus shortening the start-up time required to put the apparatus of this invention into operation in either the heating or the cooling cycle.

The weak aqua ammonia solution in the return line 21 is preferably pumped by a pump 25, operably connected to the return line 21, to the cooling coil 30. The pump 25 is preferably a small centrifugal circulating type pump which is adapted to cease pumping effectively when the pressure of the head which it is pumping exceeds a predetermined pressure. However, other types and varieties of pumps may be employed without departing from the scope of this invention.

Downstream from the pump 25 the return line 21 is divided into two branches. One branch 26 is connected to the evaporator E for a purpose which will be explained more fully in the description of the heating cycle.

A valve 26a which may be opened and closed by a solenoid or other type of actuating means 26b is open during the heating cycle but closes off communication through the line 26 during the cooling cycle.

The other branch 27 of the return line 21 is connected to the cooling coil or condenser 30. Another valve 27a, of substantially the same type as the valve 26a, is adapted to be opened and closed by an actuator 27b such as a solenoid or the like. Both of the actuators 26b and 27b may be connected to a common control means 28 such as a thermostat or the like as will be explained more fully herein.

Normally the valve 26a is closed and the valve 27a is open during the cooling cycle thereby allowing the weak aqua ammonia solution to be pumped from the return line 21 through the line 27 to the cooling coil or condenser 30 which is preferably positioned in front of the ordinary automobile radiator or in some other position where a large volume of air will be blown or forced over the surface of the cooling coil to cool the fluid therein. The coil 30 is of known construction, having one or more convoluted tubular members for receiving the fluid to be cooled. A pressure relief valve 30a is provided at the lower portion of the coil 30. The valve 30a is adapted to discharge in the event the pressure in the system exceeds a predetermined pressure, and in the preferred embodiment of this invention, the pressure relief valve 30a is positioned at the lower part of the automobile so that any substance which is discharged will be disposed of safely.

A gas relief line 32 is connected to the upper portion of the line 27 at or near the point where the line 27 is connected to the cooling coil 30, to receive any gaseous substance which may be released from the aqua ammonia solution in the line 27 to prevent a vapor lock in the line 27 or in the cooling coil 30. The gas which is received in the gas relief line 32 in the cooling cycle is returned to the system as will be explained more fully herein.

A fluid conductor line 35, which is connected to the discharge end of the cooling coil 30, is provided for conducting the cool aqua ammonia solution to the absorber D for a purpose which will be described more fully herein. The fluid conductor line 35 is divided into two branches; the branch 36 is connected to the absorber D and the branch 37 is connected to the fluid conductor 15. A valve 37a, which is similar to valves 26a and 27a, is adapted to control the flow of fluid through the line 37. The valve 37a is adapted to be opened and closed by an actuator 37b such as a solenoid or the like. The valve 37a is open in the heating cycle but is closed during the cooling cycle.

In the preferred form of this invention the actuators 26b, 27b and 37b are connected to a common control means 28, such as a thermostat or the like, which is adapted to respond to fluctuations in the temperature in the passenger compartment of the automobile. Thus, when the passenger compartment of the automobile reaches a predetermined temperature the thermostat 28 is adapted to actuate solenoids 26b, 27b and 37b. In the cooling cycle valves 26a and 37a are closed and valve 27a is open. At a predetermined temperature the thermostat 28 may be adapted to cause the solenoid 26b, 27b and 37b to reverse the positions of the valves 26a, 27a and 37a, respectively, thus closing the valve 27a and opening the valves 26a and 37a during the heating cycle of the apparatus of this invention. Of course all of the valves 26a, 27a and 37a may be operated manually without departing from the scope of this invention.

With the valve 37a closed in the cooling cycle the cool aqua ammonia fluid emerging from the cooling coil 30 is conducted by the line 35 and the line 36 to the absorber D.

The absorber D (FIG. 6) includes a tank or chamber 40 which is adapted to have a predetermined amount of liquid aqua ammonia therein at all times, is also adapted to combine a gaseous ammonia with the weak solution of aqua ammonia in such manner that the liquid will absorb the gaseous ammonia to form a strong aqua ammonia solution. In the preferred form of this invention, a truncated conical cooling coil 42 is provided for cooling the liquid ammonia in the absorber D and thereby increasing its absorption of the gaseous ammonia which is injected or fed into the chamber 40 as will be explained more fully.

The conical cooling coil 42 is composed of one or more tubular members or the like disposed within the chamber 40 with the larger diameter end 42a below the smaller diameter end 42b of the conical coil 42. An inlet pipe 42c extends through an opening 40a in the chamber 40 and is connected to the lower portion 42a of the conical coil 42 for admitting air or other cooling substances to the coil 42. A discharge tube 42d extends through an opening 40b in the chamber 40 and is connected to the smaller diameter upper end 42b of the coil 42 for discharging air or other cooling substances from the coil 42. Thus, air or other cooling substances may be circulated through the cooling coil 42 in the chamber 40 as will be explained more fully herein.

A mixture of ammonia gas and a carrier gas, such as hydrogen or the like, is fed into the chamber 40 from a pipe 41 which extends through an opening 40c in the chamber 40 at or near the top or smaller diameter end of the truncated conical cooling coil 42. The ammonia portion of the ammonia-hydrogen gas mixture is absorbed by the weak aqua ammonia solution as it washes over the surface of the cooling coil 42 and the hydrogen portion of the ammonia-hydrogen mixture is withdrawn from the chamber 40 as will be described herein.

An inlet valve member 43 which is operably connected to the line 36 has a port 43a positioned at or near the apex of the conical cooling coil 42 which is adapted to feed the weak aqua ammonia solution into the chamber 40 and to disperse it uniformly over the coil 42 as will be explained. A discharge or drain port 44 is provided in the bottom 45 of the vessel or chamber 40 and is operably connected to the fluid conductor 15. Preferably the discharge port 44 is positioned substantially co-axially of the inlet port 43a for receiving a closure member 44a. A float valve 48 is disposed within the truncated conical coil 42, is operably connected to a closure member 43b for closing the port 43a and is also operably connected to the closure member 44a for closing the discharge or drain port 44. In normal operation a sufficient amount of liquid is retained in the chamber or vessel 40 to float the float 48 and thereby unseat the valve closure 44a to open the discharge or drain pipe 44. However, it should be noted that the closure member 43b is spaced in relation to the float 48 in such a manner that a predetermined increase in the amount of liquid in the chamber 40 will cause the float 48 to rise in the chamber closing the port 43a. When the level of the liquid in the chamber 40 is at a predetermined point such as designated by the level L in FIG. 6, the valves 43b and 44a are both open, which is the usual case during the operation of the apparatus on the air-conditioning cycle. If the level L drops enough to allow the valve 44a to close the port 44, then further discharge of liquid from the absorbed A is prevented until the liquid returns to the level L. Conversely, when the liquid in the chamber 40 rises sufficiently above the level L to cause the closure member 43b to close the port 43a, additional liquid is prevented from entering into the chamber 40 until the level L returns to normal again. By adjusting the respective distances between the closure members 43b and 44a and the float 48, the maximum and minimum amount of liquid in the chamber 40 may be varied and controlled within such prescribed limits. The control of the liquid level in the absorber is important because it also maintains the correct balance of liquid in the generator G and the other parts of the apparatus B, as will be more evident hereinafter.

In the top 47 of the chamber or vessel 40 an opening 47a is provided for the release of the hydrogen gas which is separated from the ammonia-hydrogen gas mixture by the preferential absorption of the ammonia in the aqua ammonia solution in the chamber 40. A gas conductor line 49 is connected to the opening 47a for conveying the hydrogen carrier gas to another part of the cooling system as will be explained more fully herein. Also, a fill valve 50 may be provided in the top 47 of the chamber or vessel 40 for conveniently filling or charging the absorber D with the necessary aqua ammonia solution and hydrogen carrier gas initially or for replenishing these or like substances as may be required.

Considering next the apparatus of the present invention for handling the ammonia gas which is released in the gas conduit 17, the hot ammonia gas is first conducted by the gas conduit 17 through a rectifier R which is provided for cooling the gas and condensing any moisture which may be entrained with the ammonia. The condensed moisture will pass back down the gas conduit to the return passages 20. The rectifier R includes a housing 55 which extends circumferentially of the gas conduit 17 forming an annulus 55a therebetween. An inlet port 55b and a discharge port 55c are provided at opposite ends of the housing 55 for circulating air or other coolant through the annulus 55a around the gas conduit 17 to cool the hot ammonia gas conducted by the gas conduit 17 and thereby condense any moisture which may be contained therein. The air or other coolant may be forced through the annulus 55a by a fan F or the like as will be explained hereinafter.

As the ammonia gas from which the moisture has been removed in the rectifier R continues to move along the gas conduit 17 it is mixed with any additional ammonia gas which may pass from the line 27 on the cooling coil 30 through the gas relief line 32. One end of the gas relief line 32 is connected near the upper end of the line 27 near the cooling coil 30 and the other end of the gas relief line 32 is connected to the gas conduit 17 so that ammonia gas from both the gas relief line 32 and the gas conduit 17 flow to the condenser K wherein such gas is cooled and condensed into liquid ammonia. It should be noted that gas from the gas relief line 32 may be introduced into the gas conduit 17 after such conduit has passed through the rectifier R, as illustrated in the drawing (FIG. 3) as the preferred embodiment of the present invention or, the gas relief line 32 may be connected with the gas conduit 17 at other stages of the cooling cycle without departing from the scope of this invention.

The condenser K of the present invention includes a housing or jacket 60 which is disposed circumferentially around the gas conduit 17 forming an annulus 60a therebetween through which air or other coolant is circulated as will be described. The jacket or housing 60 extends longitudinally of the gas conduit 17 a sufficient distance for cooling and condensing the ammonia as required by the particular system. Also, the jacket or housing 60 insulates the conduit 17 from heat from the internal combustion engine. In the condenser K the gas conduit 17 also serves as a fluid trap adapted to receive the liquid ammonia condensed from the gaseous ammonia as it is cooled in the condenser K. Therefore, it is preferable to have the condenser K extend in a horizontal plane to retain the liquid ammonia in the condenser K.

The fan F forces air or other coolant through ducts or similar passages to one or more of the cooling stages for cooling the refrigerant in the cooling cycle. In the preferred form of this invention as illustrated in FIG. 3 of the drawings, an air duct 63 is connected to the jacket or housing 60 encasing the gas conduit and fluid trap 17 in the condenser K for forcing cooling air through the annulus 60a in the condenser K. A similar air-passage or duct 54 is provided for forcing cooling air through the rectifier R; such duct 54 being connected to the fan F at one end and to the inlet port 55b of the rectifier housing 55 at the other end for circulating cooling iar through the annulus 55a between the gas conduit 17 and the rectifier housing 55 and discharging such coolin gair through the discharge port 55c in the rectifier R.

A similar air duct or passage 42c connects the fan F to the absorber D. The fan F forces cooling air through the duct 42c and through the cooling coil 42 in the absorber D, discharging such cooling air through the discharge port 42b. The fan F, which is of known construction, has an inlet port F' which may be adapted for drawing cooling air from the passenger compartment of the automobile or from outside of the automobile for discharge through one or more of the ducts 63, 54 or 42c.

The fluid conduit 65 is connected to the gas conduit 17 for conducting the liquid ammonia which condenses in the condenser K to the evaporator E in which the liquid ammonia is expanded to a gaseous form as will be described more fully. The fluid conduit 65 has a liquid trap 65a provided therein to prevent the carrier gas which is released in the evaporator E, as will be described more fully herein, from entering the condenser K.

Considering now the evaporator E in more detail, one or more evaporator coils 71 may be provided for receiving the expanding ammonia which draws heat from the area adjacent to the evaporator E. In the preferred form of this invention, a pair of coils 71 are disposed substantially parallel to each other and are connected together at or near their upper ends by a connecting line or header 71a and are also connected together at or near their lower ends by a connecting line 71b. The liquid conduit 65, through which the liquid ammonia is conducted to the evaporator E from the condenser K, is connected to the connecting line or header 71a for feeding ammonia into the evaporator E. Also a gas return line 41 is provided for receiving the expanded ammonia gas and the carrier gas which has been circulated through the coils 71 as will be described more fully herein. The upper end of the return line 41 is connected to the connecting line or header 71b and the lower end of the return line 41 is connected to the inlet port 40c (Fig. 6) of the absorber D for returning the ammonia gas and the hydrogen carrier gas by gravity to the absorber D. It will be understood that the evaporator E is positioned at a higher elevation than the absorber D, as illustrated in FIG. 3 of the drawings, to cause the ammonia and hydrogen gas to return by gravity flow through the return line 41 from the evaporator E to the absorber D. A mixing chamber 73 is provided between the coils 71 for mixing the hydrogen carrier gas or the like with the expanding ammonia for flow together through the coils 71. One end of the gas flow line 49, which conveys the hydrogen carrier gas or the like from the absorber D, is connected to the mixing chamber 73 and the other end, is connected to the port 47a in the absorber D (FIG. 6). Ammonia, which is introduced through the header 71a into the mixing chamber 73 through the line 67, to form an ammonia hydrogen gas mix which then circulates through the coil 71 and is discharged through the header 71b to the return line 41. The ammonia-hydrogen gas mixture is returned to the absorber D through the return line 41. A fan 75, or other device for moving air across the coils 71, is provided for circulating the air in the passenger compartment of the automobile over the coils 71 for thoroughly and uniformly cooling such compartment.

It should be noted that in the preferred form of this invention the condenser K, which is disposed in a horizontal plane, should be positioned above the evaporator E to cause the liquid ammonia in the condenser K to flow by gravity into the evaporator E. However, the relative positions of the condenser K and the evaporator E could be altered without departing from the scope of this invention. Also, it should be pointed out that the evaporator E should be positioned in relation to the fire wall W of the automobile A so that the coils 71 of the evaporator E are in communication with the passenger compartment of the automobile. The evaporator E may be placed in the passenger compartment of the automobile or in an opening in the fire wall W, depending on the construction of the particular automobile in which the device of this invention is placed, without departing from the scope of this invention.

In operation, a strong solution of liquid ammonia is fed through the fluid conductor line 15 to the generator G which is operably secured to the exhaust pipe P. Hot gas or heat from the exhaust pipe P is deflected by butterfly valves 11 from the exhaust pipe P and circulated through the generator G to heat the strong aqua ammonia solution in the conductor pipe 15, releasing ammonia gas rather violently from the ammonia liquid. As the gas and liquid are discharged through the standpipe 16 in the gas conduit 17, the gas rises upwardly into the condenser K while the ammonia water falls by gravity and flows over the baffles 16 to release additional ammonia gas from the liquid. The ammonia water then flows through the heating lines 20 in the generator G for the further release of ammonia gas. The ammonia water leaving the generator G through the line 21 is a solution of water relatively weak in ammonia which is preferably circulated by the pump 25. During the cooling cycle, the weak aqua ammonia flows through the valve 27a in the line 27 to the cooling coil 30 where it is cooled by the heat transfer with a stream of cooling air moving across the coil 30 in the front of the automobile or in some other suitable position. The weak aqua ammonia solution is then returned through the lines 35 and 36 to the absorber D where it circulates over a cooling coil 42 in a chamber 40 of ammonia gas. The weak aqua ammonia solution absorbs the ammonia gas forming a strong aqua ammonia solution which is then returned through the fluid conductor line 15 to the generator G, so that a continuous cycle is provided so long as the unit is in operation.

The ammonia gas released in the gas conduit 17 is conveyed first through a rectifier R through which air or a similar coolant is circulated to cool the ammonia gas and condense and remove therefrom the moisture content of the gas. The dry gas is then conveyed through the gas conduit 17 to the condenser K where the gas is further cooled by air or other coolant circulating through the condenser K and condensed into a liquid. The liquid ammonia is then conveyed through the line 65 to the evaporator E where it is mixed with a carrier gas such as hydrogen and expanded as it circulates through the evaporator coils 71 cooling the area adjacent to the evaporator E. The ammonia-hydrogen gas mixture is then returned through the return line 41 from the evaporator E to the absorber D where the ammonia portion of the ammonia-hydrogen gas mixture is absorbed by the cool weak aqua ammonia solution circulated over the cooling coil 42 and the hydrogen gas is separated and returned through the line 49 to the mixing chamber 73 of the evaporator E for re-use with the ammonia introduced into the mixing chamber 73. Such cycle of flow through the evaporator E and absorber D is also continuous while the unit B is in operation.

Considering next the operation of the apparatus during the heating cycle, certain elements employed in the cooling cycle are also used in the heating cycle as will be described more fully. In the heating cycle, an aqua ammonia solution is circulated through the generator G in the fluid conduit 15 wherein such aqua ammonia solution is heated before being discharged through the standpipe 16 into the gas conduit 17. Heating the aqua ammonia solution in the generator G in the heating cycle causes a certain portion of the ammonia gas in the aqua ammonia gas solution to be released as also occurs in the cooling cycle. Such ammonia gas is conveyed through the conduit 17 as will be described more fully.

The hot aqua ammonia solution discharged through the standpipe 16 returns by gravity flow through the generator G to the heating lines 20 where it is further heated before draining through the line 21 to the pump 25 which may be the same in both the heating and in the cooling cycles.

In the heating cycle the valve 27a is closed and the valves 26a and 37a are open. Thus the heated aqua ammonia solution is pumped through the line 26 by the pump 25 to the evaporator E. One end of the line 26 is connected to the return line 21 and the other end is connected at or near the upper end of the coils 71 with a header 26c which is at the opposite end of the coils 71 from the mixing chamber 73. Hot aqua ammonia fluid introduced into the coils 71 through the line 26 flows by gravity through the coils 71 and is discharged through the header 71b connected at the lower end of the coils 71 into the return line 41 through which the hot aqua ammonia fluid is conveyed to the absorber D. Normally, the evaporator will be arranged in such a position that liquid introduced through the line 26 will flow by gravity through the coils 71, the header 71b and through the return line 41 to the absorber D. The liquid ammonia thus returned to the absorber D will continue to flow by gravity from the absorber D through the fluid conductor 15 back to the generator G where it will be reheated and recirculated through the heating cycle.

It should be noted that in the heating cycle the ammonia gas released into the gas conduit 17 will be substantially prevented from passing into the condenser K due to the vapor pressure in the condenser K caused by high temperature in the evaporator E during the heating cycle and therefore such ammonia gas will flow through the line 32 to the cooling coil 30 rather than passing through the line 65 to the evaporator E. The liquid ammonia accumulating in the cooling coil 30 drains out of the cooling coil 30 through the lines 35 and 37 and thence through the open valve 37a into the fluid conductor 15 through which it is returned to the generator G for reheating and recycling.

It should also be noted that in the heating cycle it is not necessary that the fan F be operated to force air through the absorber D, the rectifier R or the condenser K. However, the fan 75 positioned in close proximity to the evaporator coils 71 should preferably be operated to circulate air from the passenger compartment in the automobile over the coils 71 to distribute heat from the coils 71 throughout the compartment.

Thus, in the operation of the heating cycle of the present invention as liquid aqua ammonia is conducted through the generator G by the fluid conductor 15 it is heated by gas or heat from the exhaust pipe P both before it is discharged through the standpipe 16 in the gas conduit 17 and subsequently as it returns in the return lines or passages 20 through the generator G. The heated aqua ammonia solution is then pumped from the return line 21 by the pump 25 through the line 26 into the header 26c and the evaporator coils 71. The heated aqua ammonia liquid preferably flows through the evaporator coils 71 by gravity and thence through the header 71b and the return line 41 to the absorber D. Liquid collecting in the absorber D is then returned through the fluid conductor 15 to the generator G where it is heated for thus providing a continuous circulation of the heating fluid during the heating cycle. Also, the liquid ammonia in the cooling coil 30 drains through the lines 35 and 37 to the fluid conductor 15 whereby such liquid ammonia is returned to the generator G for heating and recycling.

Thus, the apparatus B of this invention may be used selectively for either heating or air-conditioning an automobile or other space. Various known controls may be employed for switching from one cycle to another such as schematically indicated by the numeral 28 in FIG. 3. Although the apparatus B is preferably used as a combination heating and air-conditioning apparatus, it will be appreciated that the air-conditioning portion or the heating portion may be made and used separately, but with the combination disclosed herein, the same heating-refrigeration substance may be used for both cycles, and many of the same components are also used in both cycles thereby making the unit more economical and compact while still performing both functions.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A combination absorption refrigeration system for cooling and heating, comprising:
    (a) a first circuit providing a cooling cycle and having
        (1) a heat exchanger coil, and
        (2) means for evaporating a refrigerant in said heat exchanger coil to effect cooling in the area surrounding said heat exchanger coil,
    (b) a second circuit providing a heating cycle for circulating aqueous ammonia solution to effect heating in said heat exchanger coil,
    (c) an absorber means connected in said first circuit and in said second circuit for increasing the concentration of the aqueous ammonia solution in said cooling cycle,
    (d) a generator to heat said aqueous ammonia solution for vaporization thereof in the first circuit during cooling cycle and to heat the aqueous ammonia solution in the second circuit during the heating cycle,
    (e) means in said absorber for controlling the level of the aqueous ammonia solution in said absorber and in said generator, and
    (f) means for alternately introducing refrigerant into said heat exchanger coil during the cooling cycle and liquid aqueous ammonia solution during the heating cycle to alternately provide for heating and cooling with the sytem.

2. In a cooling and heating apparatus wherein a first circuit is provided for a cooling cycle, a second circuit is provided for a heating cycle and a liquid refrigerant is provided for evaporation as a gas in the cooling cycle and a liquid having some of said refrigerant therewith is used for heating in the heating cycle, the improvement residing in a regulator valve means comprising:
    (a) a chamber,
    (b) a double-acting valve having an upper valve and a lower valve disposed in said chamber,
    (c) a fluid inlet port above said upper valve and a fluid discharge port below said lower valve in said chamber,
    (d) float means operably connected to said valve for normally maintaining both said fluid inlet port and said fluid discharge port open for causing weak aqua ammonia solution to enter through said fluid inlet port and to discharge as rich aqua ammonia solution through said fluid discharge port, and
    (e) means for closing said inlet port while said discharge port is open in the event the liquid exceeds a predetermined level in said chamber and for opening said inlet port while said discharge port is closed in the event the liquid falls below a predetermined level in said chamber.

3. In a absorption type refrigeration apparatus having an evaporator, absorber, condenser, cooling coil, and generator, residing in a regulator valve means for controlling the liquid level in both said absorber and said generator comprising:
    (a) an absorber chamber,
    (b) a fluid inlet port in said chamber connected to said cooling coil and a fluid discharge port in said chamber connected to said generator, and
    (c) float means having valve means for said inlet port and for said discharge port connected thereto and movable therewith for opening and closing said inlet port and said discharge port to control the level of the aqueous ammonia solution in said absorber chamber and in said generator.

4. In a cooling and heating apparatus wherein a first circuit is provided for a cooling cycle, a second circuit is provided for a heating cycle and a liquid refrigerant is provided for evaporation as a gas in the cooling cycle and a liquid having some of said refrigerant therewith is provided for heating in the heating cycle, the improvement residing in an absorber unit comprising:
    (a) a chamber having disposed therein a coil having progressively larger convolutions from the upper to the lower end and adapted for circulating a cooling agent therethrough,
    (b) means for distributing weak aqua ammonia solution over the upper surface area and both side surfaces of each convolution of said coil so as to increase the surface area of said weak aqueous ammonia solution exposed for absorption.

5. In a cooling and heating apparatus wherein a first circuit provided for a cooling cycle, a second circuit is provided for a heating cycle and a liquid refrigerant is provided for evaporation as a gas in the cooling cycle and a liquid having some of said refrigerant therewith is provided for heating in the heating cycle, the improvement residing in an absorber unit comprising:
 (a) a chamber having disposed therein a truncated conical coil adapted for circulating a cooling agent therethrough,
 (b) means for distributing the weak aqueous ammonia solution over the surface of said truncated conical coil progressively downwardly from the upper turns to the lower turns of said coil for absorbing, and
 (c) means for introducing the refrigerant vapor into said chamber for absorption by weak aqua ammonia solution.

6. In a combination absorption refrigeration system for cooling and heating wherein a first circuit is provided for a cooling cycle and a second circuit is provided for a heating cycle and a liquid refrigerant is provided for vaporing in the cooling cycle and a liquid having some of said refrigerant therewith is provided for heating in said heating cycle, the improvement residing in a generator adapted for use with the exhaust gas of an internal combustion engine wherein said generator includes:
 (a) a heat exchange generator chamber adapted to receive rich aqua ammonia solution,
 (b) a substantially U-shaped tube mounted in said chamber,
 (c) means for introducing said liquid into said tube,
 (d) means for discharging said liquid from said tube,
 (e) means for introducing exhaust gas from an internal combustion engine into said chamber outside of said tube, and
 (f) regulator means provided for regulating the exhaust gas from the internal combustion engine for controlling the temperature of said heat exchange chamber.

7. In a combination absorption refrigeration system for cooling and heating wherein a first circuit is provided for a cooling cycle and a second circuit is provided for a heating cycle, the improvement residing in a generator adapted for use with the exhaust gas of an internal combustion engine wherein said generator includes:
 (a) a heat exchange generator chamber adapted to receive rich aqueous ammonia solution,
 (b) means adapted to heat said heat exchange chamber with exhaust gas from an internal combustion engine,
 (c) regulator means provided for regulating the exhaust gas from the internal combustion engine for controlling the temperature of said heat exchange chamber,
 (d) an inlet tube extending into said chamber and exposed to the exhaust gas passing through the chamber to pre-heat the rich aqueous ammonia solution in said heat exchange chamber to a predetermined temperature in both the cooling and in the heating cycles, and
 (e) a plurality of return tubes also disposed in said chamber and exposed to the exhaust gas passing through the chamber for further heating of the rich aqueous ammonia solution to a predetermined temperature in both the cooling and the heating cycles.

8. In a cooling and heating apparatus wherein a first circuit is provided for a cooling cycle, a second circuit is provided for a heating cycle and a liquid refrigerant is provided for evaporation as a gas in the cooling cycle and a liquid having some of said refrigerant therewith is provided for heating in the heating cycle, the improvement residing in a generator unit comprising:
 (a) a heat exchange chamber having a plurality of substantially U-shaped tubular members mounted therein for receiving the liquid,
 (b) means adapted for conducting waste heat from an internal combustion engine around said tubular members in said heat exchange chamber for heating said liquid, and
 (c) control means adapted to regulate the temperature of said heat exchange chamber.

9. In an absorption refrigeration cooling and heating apparatus wherein a first circuit is provided for a cooling cycle and a second circuit is provided for a heating cycle and wherein liquid ammonia is provided in the cooling cycle and aqueous ammonia solution is provided in the heating cycle, the improvement residing in a heat exchanger means adapted for expanding said liquid ammonia into a gaseous form in the cooling cycle and for receiving said aqueous ammonia solution in the heating cycle, wherein the heat exchanger means comprises:
 (a) a plurality of coil means for expanding said liquid ammonia into a gaseous form,
 (b) a mixing chamber connected at the inlet of said plurality of coil means forming a part of said coil means,
 (c) means for injecting said liquid ammonia into said mixing chamber in the cooling cycle,
 (d) means for injecting a carrier gas into said mixing chamber for mixture with said liquid ammonia in the cooling cycle,
 (e) means for injecting aqueous ammonia solution into said coil means in the heating cycle, and
 (f) discharge means for discharging the gaseous mixture from said coil means during the cooling cycle and for discharging the aqueous ammonia solution from said coil means in the heating cycle.

10. An absorption refrigeration system, comprising:
 (a) a heat exchanger coil,
 (b) means for evaporating a refrigerant in said heat exchanger coil to effect cooling in the area surrounding said heat exchanger coil,
 (c) an absorber means operably connected with said heat exchanger coil for increasing the concentration of the aqueous ammonia solution therein,
 (d) a generator to heat said aqueous ammonia solution for the evaporization thereof, and
 (e) a float valve in said absorber for controlling the inlet and outlet of aqueous ammonia liquid from the absorber for thereby controlling the level of the aqueous ammonia liquid in said absorber and in said generator.

References Cited in the file of this patent

UNITED STATES PATENTS

| | | |
|---|---|---|
| 985,160 | Goodyear | Feb. 28, 1911 |
| 1,073,534 | Shoemaker | Sept. 16, 1913 |
| 1,860,133 | Brock | May 24, 1932 |
| 2,142,960 | Zellhoefer | Jan. 3, 1939 |
| 2,196,911 | Getaz | Apr. 9, 1940 |
| 2,207,838 | Thomas | July 16, 1940 |
| 2,248,178 | Kuenzli | July 8, 1941 |
| 2,402,413 | Kogel | June 18, 1946 |
| 2,481,520 | Knoy | Sept. 13, 1949 |
| 2,953,907 | De Cicco et al. | Sept. 27, 1960 |